United States Patent
Monchatre

(10) Patent No.: US 6,233,973 B1
(45) Date of Patent: May 22, 2001

(54) PROCESS FOR MANUFACTURING A GLASS CONTAINER

(75) Inventor: Ghislaine Monchatre, Paris (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 09/247,089

(22) Filed: Feb. 9, 1999

(30) Foreign Application Priority Data

Feb. 9, 1998 (FR) .................................................. 98 01496

(51) Int. Cl.⁷ .................................................. C03B 23/26
(52) U.S. Cl. .......................... 65/64; 65/76; 65/79; 65/80; 65/81; 65/105; 65/112
(58) Field of Search .................................. 65/22, 63, 64, 65/76, 77, 78, 79, 70, 80, 81, 105, 110, 112

(56) References Cited

U.S. PATENT DOCUMENTS

| 237,371 | * | 2/1881 | Deal et al. . |
| 345,265 | * | 7/1886 | Webb . |
| 363,190 | * | 5/1887 | Webb . |
| 1,715,130 | | 5/1929 | Haley ........................................ 65/22 |
| 1,816,045 | * | 7/1931 | Haley . |
| 4,367,086 | * | 1/1983 | Sarpaneva . |

FOREIGN PATENT DOCUMENTS

| 1596463 | 2/1971 | (DE) . |
| 2459469 | 11/1975 | (DE) . |
| 1058684 | 3/1954 | (FR) . |
| 2134337 | 12/1972 | (FR) . |
| 2134338 | 12/1972 | (FR) . |

* cited by examiner

Primary Examiner—Sean Vincent
(74) Attorney, Agent, or Firm—Oblon, Spivak, McClelland, Maier & Neustadt, P.C.

(57) ABSTRACT

A process for the formation of a container of glass, includes a first molding step performed in a preforming mold having pins projecting into the mold over a length less than the thickness of the walls of the preform of the article, the external walls of the preform presenting after removal from the mold recessed portions corresponding to the presence of the projecting pins. A second step is performed in a smooth-walled finishing mold having the shape and the dimensions of the container to be made, the blowing pressure in the interior of the finishing mold being controlled so as to permit a smoothness of the external wall of the container and the formation of air inclusions in the wall of the container.

11 Claims, 4 Drawing Sheets

PROCESS FOR MANUFACTURING A GLASS CONTAINER

BACKGROUND OF THE INVENTION

1. Field of the Invention

The present invention relates to a new process for molding a glass container. Such containers are particularly adapted for the storing of cosmetic products, notably perfumes.

2. Description of the Related Art

Containers of glass are generally formed by inflation or compression of a preform in a shaping mold, then inflation of the preform in a finishing mold having the dimensions and the form of the container to be made. In the field of cosmetics, in particular perfumes, there is constant research into new aesthetic shapes, always more attractive for the consumer, and/or which are representative of this or that new characteristic of the perfume, notably a particular scent. Recent years have been marked by the appearance of a multitude of new shapes, colors or concepts for the storing of perfumes. Certain of these new concepts have shown themselves to be unsatisfactory or more costly to put into practice.

SUMMARY OF THE INVENTION

It is an object of the invention to provide a new, economically viable process for forming a container of glass.

It is another object of the invention to provide a new, economically viable process for forming a container of glass whose walls include a multitude of air inclusions trapped in the wall material and disposed in a predetermined manner.

It is yet another object of the invention to produce a container presenting an original visual aspect, perfectly reproducible and able to be formed by a totally automatable process.

According to a first aspect of the invention these and other objects are achieved by a process for the forming of a glass container by carrying out the molding in two successive steps: a first step is performed in a preforming mold having pins projecting into the interior of the mold over a length less than the thickness of the walls of the preform of the article, the external walls of the preform presenting, after removal from the mold, recessed portions corresponding to the presence of the projecting pins. The second step is performed in a smooth-walled finishing mold having the shape and the dimensions of the container to be formed, the blowing pressure within the finishing mold being controlled so as to permit a smoothness of the external wall of the container and the formation of air inclusions in the wall of the container. In the preforming mold the material may be brought into intimate contact against the mold walls either by blowing or by pressing with a punch.

There is thus obtained a container presenting particularly original aesthetic characteristics, able to be formed in a perfectly reproducible manner by a process capable of being entirely automated.

Advantageously the pins of the preforming mold are able to pass from a first position in which they do not substantially project relative to the internal walls of the mold to a second position in which they project relative to the internal walls of the mold over a length less than the thickness of the walls of the preform, so as not to penetrate them. The fact that the pins may be retractable facilitates the manner of removing the preform from the mold. In particular, in the case of a totally automated process the possibility of damage or scoring of the glass is avoided.

By way of example the pins may be actuated by a pneumatic system. Preferably all of the pins are actuated in a simultaneous manner by the same pneumatic system. Such pins controlled by a pneumatic system are well known in the field of molding of thermoplastic materials, notably when there is a need to form an orifice opening into a molded piece.

The pins may be of circular, triangular, square, oval or star-shaped cross-section. Other forms may be envisaged as a function of the aesthetic or functional effect of the air inclusions on the consumer, or of the product characteristics to be emphasized by the air inclusions.

Advantageously the preforming and finishing molds are each formed of at least two shell parts able to be closed along at least two lines parallel to the longitudinal axis of the container. In the case of a preforming mold with non-retractable pins, the pins are arranged relative to the line of opening of the mold such that the pins do not interfere with removal from the mold. Furthermore, in this case the parison is lowered into the mold before closing of the mold, so as to avoid scoring of the glass. The glass may be clear or colored glass.

In a variant of the process according to the invention, before being introduced into the finishing mold the preform is reheated so as to facilitate the molding in the finishing mold, the objective being to bring the preform back to a temperature such that the material may be blown and correctly molded in the finishing mold.

In another variant, before being introduced into the finishing mold, the preform is immersed in a bath of molten glass so as to coat the external surface of the preform with a fine glass layer, said fine glass layer not modifying in any substantial way the profile of the external wall of the preform.

In yet a further variant, the container removed from the finishing mold is plunged into a bath of molten glass and again blown in an auxiliary mold, the blowing pressure being controlled so as not to provoke the bursting of the air inclusions. One may thus improve the surface quality of the finished container.

According to a second aspect of the invention there is also provided a glass container obtained by the above process.

Advantageously the air inclusions have dimensions which are variable as a function of the ratio of the dimensions of the preforming mold to those of the finishing mold. In fact, when using a finishing mold of relatively great height for blowing a preform obtained in a mold of smaller height, the material is subjected to stretching which is not identical in all parts of the mold. Thus, due to the greater thickness of the preform in the region of its bottom, the material situated opposed to the blowing nozzle will be stretched less than that situated adjacent to the blowing nozzle. Bubbles will thus decrease in height in the direction towards the bottom of the container.

For example, the container according to the invention may be of the type comprising a body which is surmounted by a neck and closed by a bottom, the air inclusions being of a height continually increasing in the direction towards the neck. With this embodiment, the blowing of the container occurs from its open shoulder so as to cause a stretching of the material and of the air inclusions, to a greater extent in proportion to the closeness to the neck.

BRIEF DESCRIPTION OF THE DRAWINGS

Apart from the features disclosed above, the invention includes a number of other features which will become evident hereinafter, as understood with regard to the exemplary, non-limiting embodiments described with reference to the accompanying drawings, in which.

DETAILED DESCRIPTION OF THE PREFERRED EMBODIMENTS

Figure 1A:
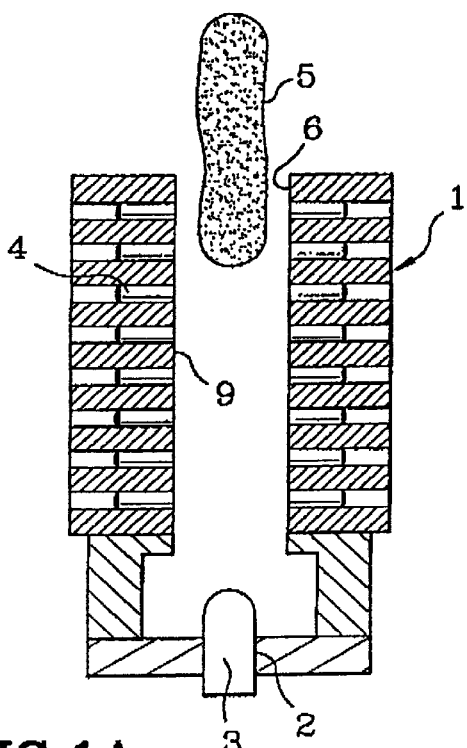
FIGS. 1A to 1I illustrate schematically different steps of one preferred form of the process according to the invention.

In FIG. 1A, a glass parison 5 having a relatively viscous state is introduced into a preforming mold 1 formed of two half shells capable of being closed at a partition plane passing along the axis of the bottle. Typically, the glass is at a temperature which may vary from 700° C. to 1050° C. In this temperature range the viscosity of the glass is typically from 1,000 poises to 10,000,000 poises. The bottom of the mold 1 has an opening 2 removably closed by a closure device 3. The material is introduced into the mold 1 by an opening 6 situated opposite the opening 2. This opening 6 is closed, before blowing, by a removable member 7. The mold 1 has, in substantially all of its lateral walls, regularly disposed (for example, axially and circumferentially of the mold) bores holding pins 4 which are controlled by a pneumatic system (not shown) for selectively passing from a retracted position (FIG. 1A) in which their free ends 10 do not substantially project from the internal surface 9 of the mold, to an advanced position (FIG. 1D) in which their free ends 10 project relative to the internal surface 9 of the mold.

Figure 1B:
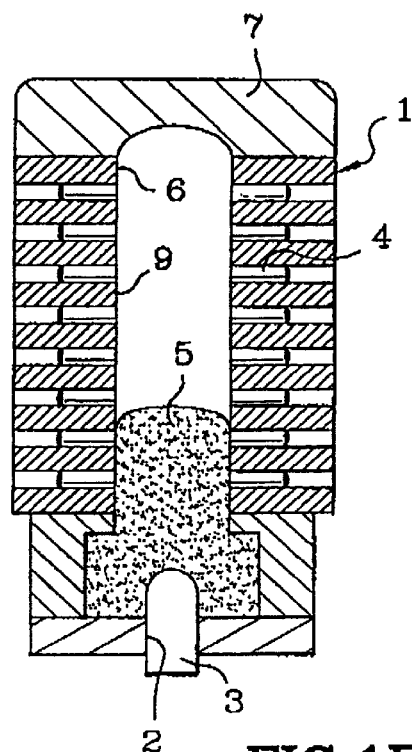

In FIG. 1B the mass of the glass 5 in a pasty state is disposed on the floor of the preforming mold 1. The opening 6 is closed by the removable member 7.

Figure 1C:
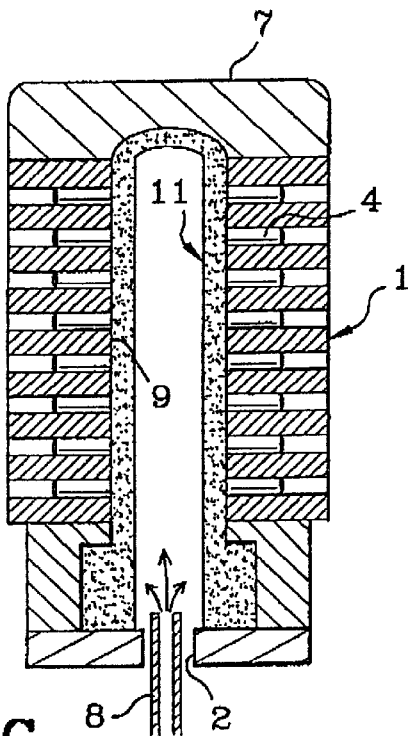

In FIG. 1C the closure device 3 has been removed so as to open the orifice 2 and allow the introduction of a blowing nozzle 8. As a result, the interior of the mold 1 is pressurized, typically on the order of 1 to 2 bars. Under the effect of the blowing pressure, the glass 5 is pressed against the internal walls 9 of the preforming mold 1, adopting completely the profile of that mold and forming what will hereinafter be called a "preform" 11. For reasons of simplicity the preform 11 has been shown with walls having a constant thickness. In practice the thicknesses of the walls will not be identical overall. In particular, the thickness of the bottom will generally be greater than that of the rest of the preform.

Figure 1D:
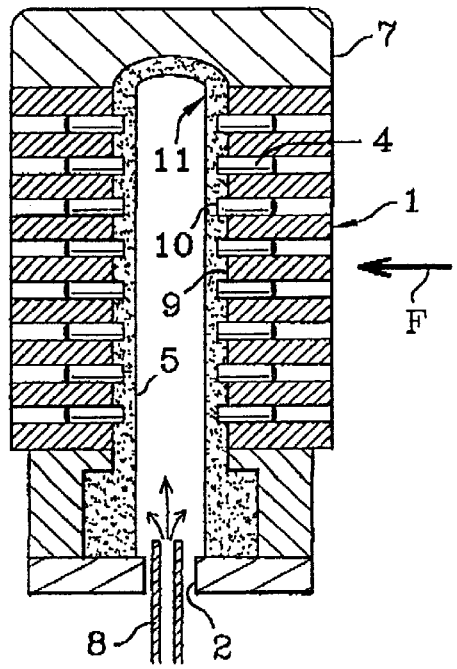

In FIG. 1D the pins are displaced perpendicular to the axis of the mold, as illustrated by the arrow F, such that their free ends 10 penetrate into the material 5 constituting the preform 11, by around ⅔ of the wall thickness of the preform. During this operation the blowing pressure is maintained within the mold. Generally, the ratio between the thickness of the lateral walls of the preform and the depth of penetration of the pins into the material is from 1.3 to 2, preferably from 1.5 to 2.

Figure 1E:
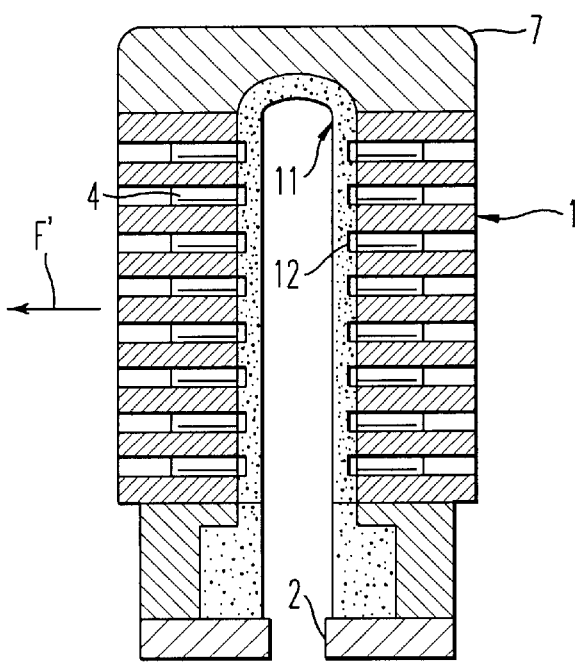

In FIG. 1E the blowing pressure has been interrupted and the pins 4 have been retracted by a movement whose direction is illustrated by the arrow F', such that they are entirely retracted into the interior of the walls of the mold 1.

Figure 1F:
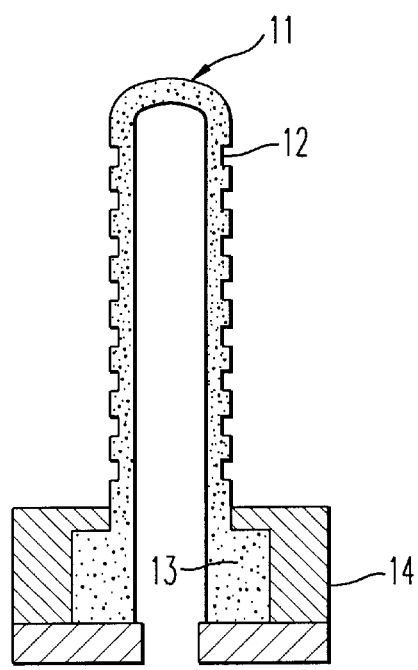

In FIG. 1F the preform 11 is removed from the mold but is held by a part 14 of the mold within which is to be formed the neck 13 of the container. As can clearly be seen, the external surface of the preform 11 presents recessed portions or hollows 12 in the regions where the pins 4 have been introduced.

Figure 1G:
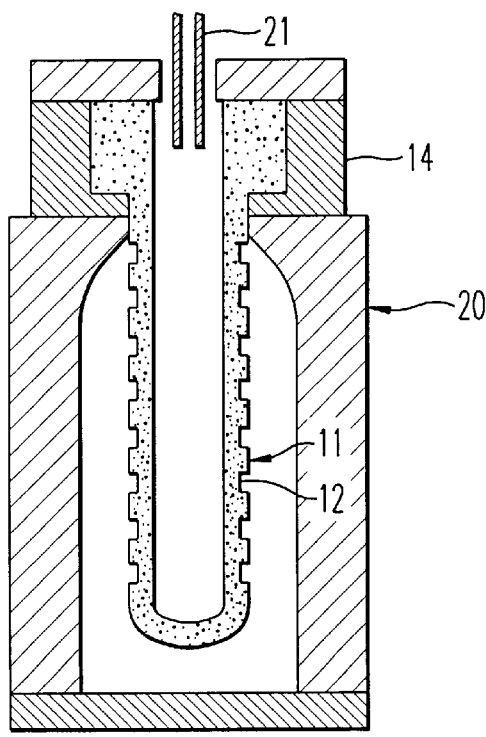

In FIG. 1G the preform 11 held by the portion 14 is introduced into the smoothwalled finishing mold 20 whose dimensions and shape correspond to the dimensions and the shape of the container to be formed. Advantageously, it may be necessary, before introducing the preform 11 into the mold 20, to restore it to the appropriate molding temperature by passing it through a heating device. It is also possible, before introducing the preform 11 into the finishing mold 20, to immerse it in a bath of liquid glass (maintained at a temperature above 1600° C.), in a manner so as to envelop it with a fine glass layer without otherwise modifying in a substantial manner the profile which the preform had when leaving the preforming mold 1.

Figure 1H:
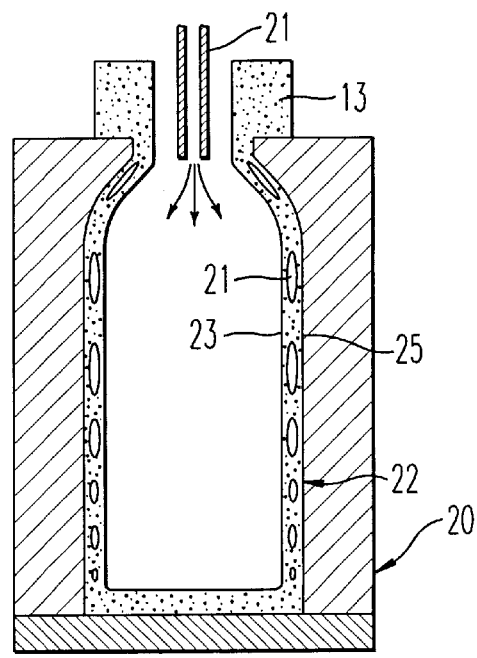

Once the preform 11 has been disposed in the finishing mold, the glass is blown in a softened state with the aid of an inflation nozzle 21, which results in the walls of the preform intimately contacting the interior surface of the mold 20 (FIG. 1H). In carrying out this step, the air contained in the hollows 12 of the preform 11 is trapped within the wall 23 of the container 22 in the form of inclusions 21. In fact the hollows 12 are caused to close by the blowing pressure exerted on the material, applying the material against the smooth surface of the finishing mold 20. The external walls 25 of the container 22 are thus substantially smooth. During this blowing phase in the finishing mold 20, the inflation pressure must not be so high as to provoke bursting of the air inclusions 21 either at the interior or the exterior of the container 22. It should, however, be sufficient to permit the smoothness of the external surface 25 of the container to be achieved.

Furthermore, due to the presence of inflation in a mold having dimensions which are generally greater than the dimensions of the preforming mold 1, the air inclusions are extended in a longitudinal and lateral direction, proportional to the variation of the dimensions existing between the internal sides of the preforming mold 1 and those of the finishing mold 20. It is possible to adjust these variations of dimensions between the preforming mold and the finishing mold to produce highly varied effects in the shape and the disposition of the air inclusions in the final container 22.

Figure 2A:
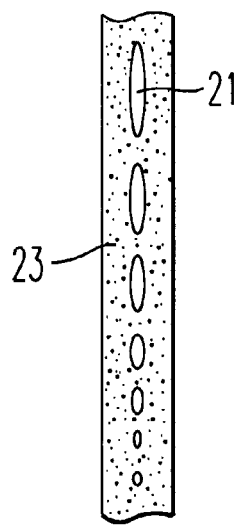
FIGS. 2A and 2B represent in section parts of the wall of the container obtained by the process of the invention.
Figure 2B:
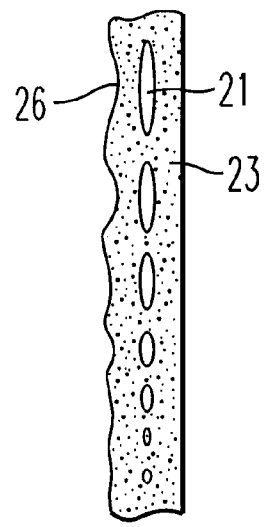

As a function of the blowing pressure and of the size of the air inclusions formed in the wall of the container, the internal surface of the container 22 may be substantially smooth (FIG. 2A) or have recessed zones 26 relative to the air inclusions 21 (FIG. 2B), which recessed zones 26 are due to the lower resistance offered by the wall 23 in the regions where the air inclusions 21 are situated. FIGS. 2A and 2B also show the dimensional variations of the air inclusions 21, notably longitudinally, due to the extension of the material of the walls in the finishing mold 20. As will be clearly apparent from FIG. 2B, the recessed zones 26 formed in the wall 23 have a thickness decreasing with the size of the air inclusions 21.

Figure 1I:
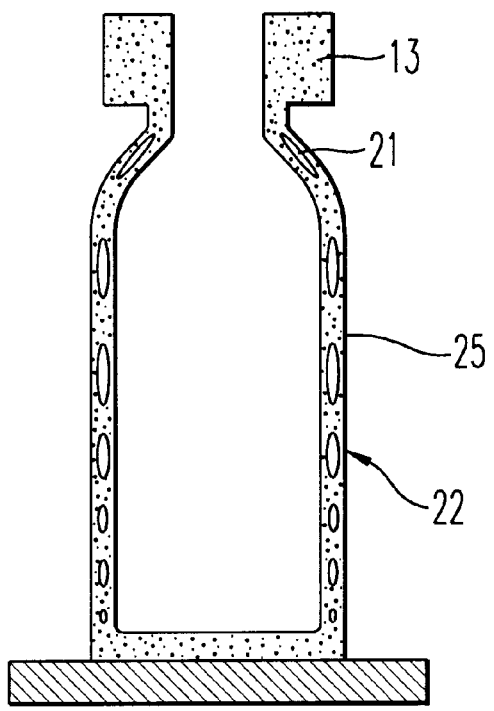

In the step of FIG. 1I, the container 22 has been removed from the mold then reheated to a temperature of from 550° C. to 560° C. After reheating, the container 22 is finally re-cooled in a progressive manner.

Figure 3:
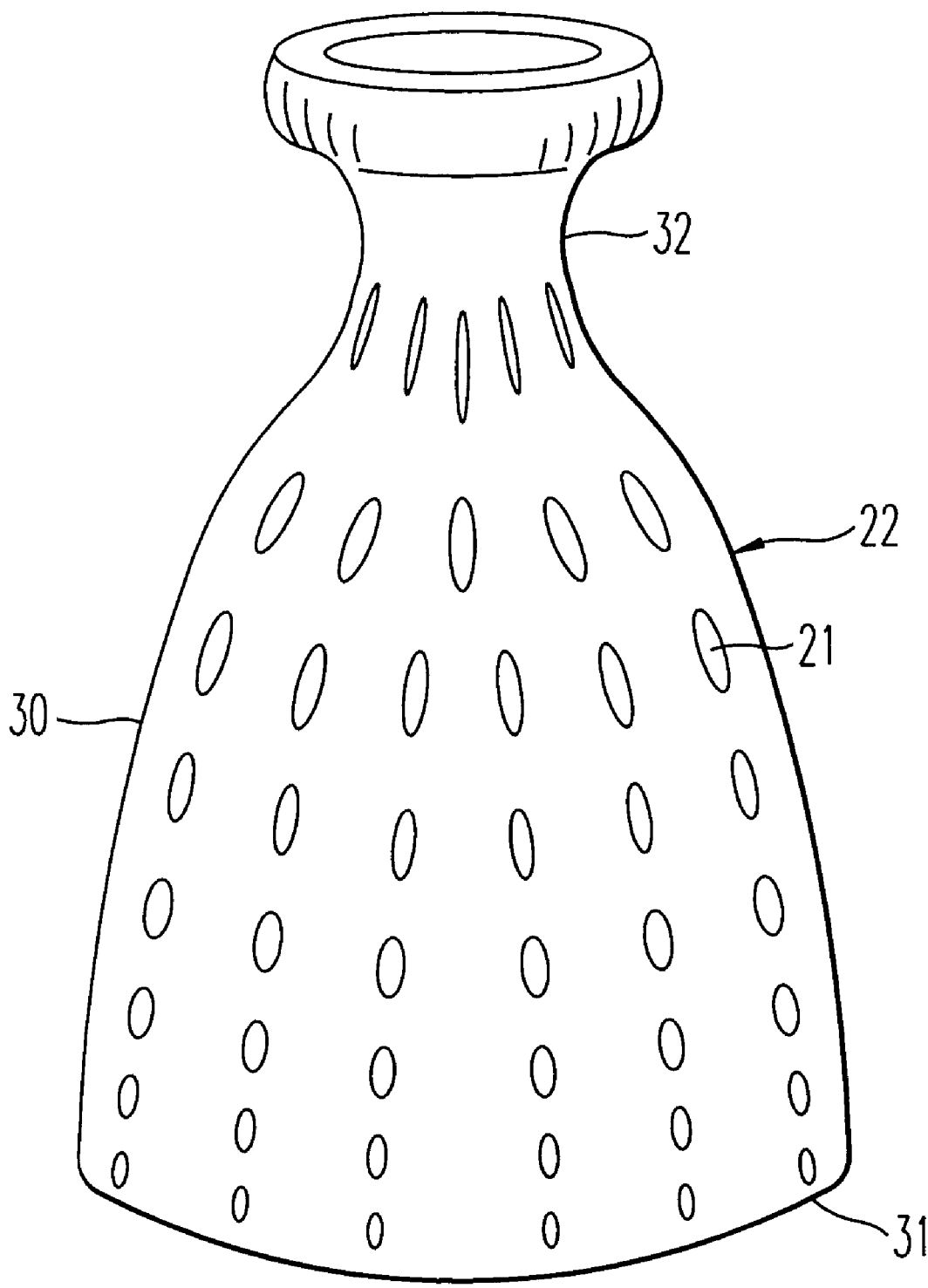
FIG. 3 illustrates an embodiment of the container formed by the invention.

FIG. 3 shows an embodiment of container 22 obtained by the above described process, but using a finishing mold having a shape substantially different from that of the finishing mold shown in FIGS. 1G and 1H. This container has the form of a bottle comprising a body 30 closed by a bottom 31 and whose end opposed to the bottom terminates at an open neck 32. As already explained, the bottle has, distributed in a predetermined manner in its wall, air inclusions 21 whose heights increase progressively in the direction towards the neck 32. For this particular bottle the blowing has been carried out through the neck 32.

In the detailed description above reference has been made to preferred embodiments of the invention. It is evident that variants may be introduced without departing from the spirit of the invention, such as claimed hereinafter.

What is claimed is:

1. A process for forming a glass container, comprising:
   a first forming step of forming a preform in a preforming mold having pins projected from an internal surface of the preforming mold, such that an external surface of a wall of the preform has recessed portions;
   a step of retracting the pins into the preforming mold and removing the preform from the preforming mold; and
   a second forming step of forming the container in a smooth walled finishing mold by raising a gas pressure within the finishing mold so as to smooth the external surface of the wall of the container and transform the recessed portions into air inclusions in the wall of the container.

2. The process according to claim 1, wherein said first forming step includes the sequential steps of introducing a viscous glass parison into the preforming mold, shaping the parison to conform to the walls of the preforming mold, thereby forming the preform, and projecting the pins from the preforming mold into the external surface of the wall of the preform by a length less than a thickness of the wall of the preform, to form said recessed portions.

3. The process according to claim 2, wherein the pins project into the external surface of the wall of the preform by a distance such that a ratio between the thickness of the wall of the preform and a depth of penetration of the pins into the wall is from 1.3 to 2.

4. The process according to claim 2, wherein the pins are projected by a pneumatic system.

5. The process according to claim 2, wherein the pins are one of circular, triangular, square, oval and star shaped in cross-section.

6. The process according to claim 1, wherein the preforming and finishing molds are each comprised by at least two shell portions which are closed along at least two lines parallel to a longitudinal axis of the container.

7. The process according to claim 1, wherein the glass is one of clear and colored glass.

8. The process according to claim 1, including a step, performed before said second forming step, of heating the preform so as to facilitate shaping in the finishing mold.

9. The process according to claim 2, wherein the pins project into the external surface of the wall of the preform by a distance such that a ratio between the thickness of the wall of the preform and a depth of penetration of the pins into the wall is from 1.5 to 2.

10. A process for forming a glass container, comprising:
    a first forming step of forming a preform in a preforming mold such that an external surface of a wall of the preform has recessed portions;
    a second forming step of forming the container in a smooth walled finishing mold by raising a gas pressure within the finishing mold so as to smooth the external surface of the wall of the container and transform the recessed portions into air inclusions in the wall of the container; and
    a step, performed before said second forming step, of immersing the preform in a bath of molten glass so as to coat the external surface of the wall of the preform with a fine layer of glass, the fine glass layer not substantially modifying a profile of the external wall.

11. A process for forming a glass container, comprising:
    a first forming step of forming a preform in a preforming mold such that an external surface of a wall of the preform has recessed portions;
    a second forming step of forming the container in a smooth walled finishing mold by raising a gas pressure within the finishing mold so as to smooth the external surface of the wall of the container and transform the recessed portions into air inclusions in the wall of the container; and
    further step of immersing the container in a bath of molten glass before the second forming step, wherein the second forming step is performed using a gas pressure controlled so as not to burst the air inclusions.

\* \* \* \* \*